US006929324B2

(12) United States Patent
Enomoto et al.

(10) Patent No.: US 6,929,324 B2
(45) Date of Patent: Aug. 16, 2005

(54) VEHICLE SEAT INCORPORATED WITH AN OCCUPANT SENSOR

(75) Inventors: Takayuki Enomoto, Tokyo (JP); Takashi Takeshita, Kanagawa (JP); Takuya Nishimoto, Kanagawa (JP); Naobumi Kuboki, Kanagawa (JP); Katsutoshi Sasaki, Kanagawa (JP); Norio Kawashima, Kanagawa (JP); Hiroaki Nishiguma, Kanagawa (JP); Atsuo Matsumoto, Kanagawa (JP); Shinichi Horibata, Kanagawa (JP); Ko Masuda, Kanagawa (JP); Yuji Niikura, Kanagawa (JP); Hiroshi Matsunaga, Kanagawa (JP); Yuji Tokiwa, Kanagawa (JP)

(73) Assignees: NHK Spring Co., Ltd., Kanagawa (JP); The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/628,694

(22) Filed: Jul. 28, 2003

(65) Prior Publication Data

US 2004/0160110 A1 Aug. 19, 2004

(30) Foreign Application Priority Data

| Jul. 29, 2002 | (JP) | ............... 2002-219948 |
| Jun. 4, 2003 | (JP) | ............... 2003-159746 |
| Jun. 4, 2003 | (JP) | ............... 2003-159747 |

(51) Int. Cl.$^7$ .................................................. A47C 7/62
(52) U.S. Cl. ........................... 297/217.3; 297/452.54
(58) Field of Search .......................... 297/217.3, 452.54, 297/180.11, 180.12

(56) References Cited

U.S. PATENT DOCUMENTS 5,810,392 A * 9/1998 Gagnon ...................... 280/735

FOREIGN PATENT DOCUMENTS

| EP | 0930032 A1 * | 7/1999 | ............ A47C/7/62 |
| JP | 2001180353 | 7/2001 | |
| JP | 2001294119 | 10/2001 | |
| JP | 2003279399 A * | 10/2003 | ............ G01G/19/12 |

* cited by examiner

Primary Examiner—Anthony D Barfield
(74) Attorney, Agent, or Firm—Marshall & Melhorn, LLC

(57) ABSTRACT

In a vehicle seat, a central support member typically consisting of wire mesh or grid and supports most of the load of the vehicle occupant via spring members, and undergoes a relatively large displacement when the occupant is seated in the seat. Thus, by detecting the displacements of various parts of the central support member, preferably peripheral parts thereof, the magnitude of the total load and distribution of the load can be evaluated both reliably and accurately. Additionally, displacement sensors for measuring such large displacements are relatively inexpensive and easy to handle. Also, such sensors would not interfere with the existing seat designs, and would not be adversely affected by the equipment of the seat such as seat heaters.

19 Claims, 16 Drawing Sheets

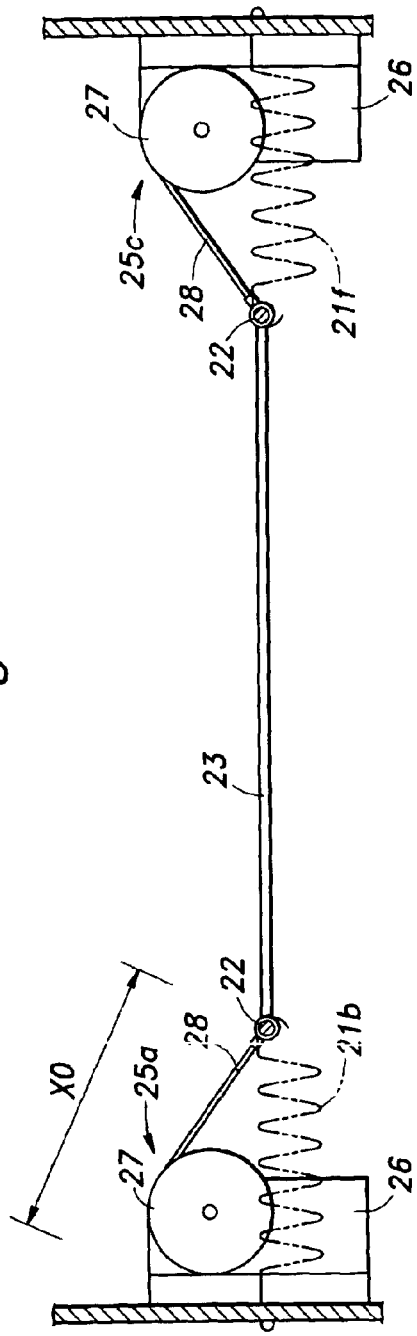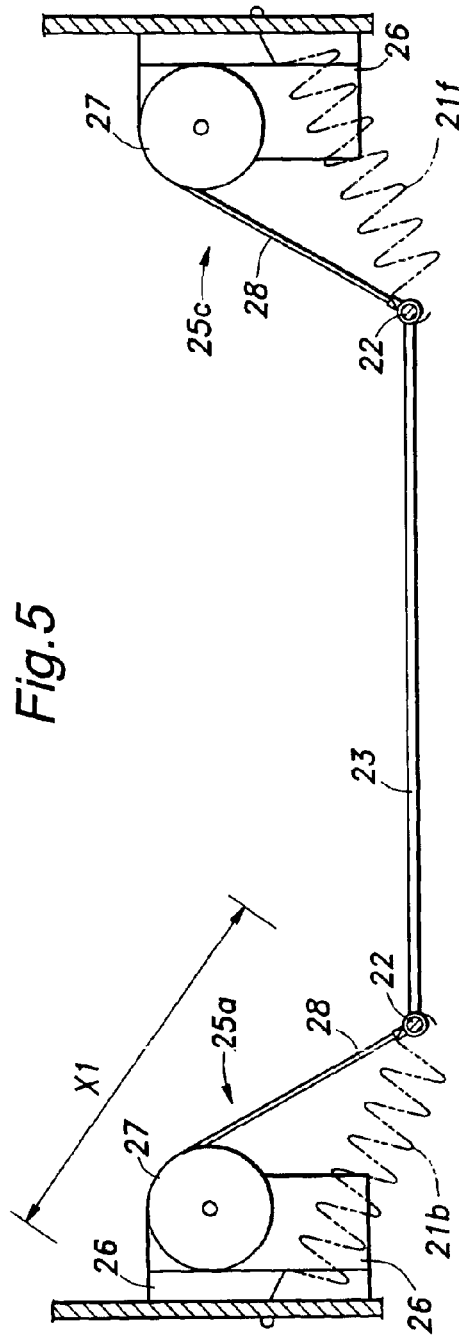

VEHICLE SEAT INCORPORATED WITH AN OCCUPANT SENSOR

TECHNICAL FIELD

The present invention relates to a vehicle seat incorporated with an occupant sensor that can identify the nature of the vehicle occupant, for instance, for the purpose of controlling a vehicle occupant restraint system such as an air bag system.

BACKGROUND OF THE INVENTION

A vehicle occupant system for restraining a vehicle occupant at the time of a crash or other high acceleration situations is designed for a wide range of the build of the vehicle occupant, but can provide an optimum performance only when it is designed for a more specific type of vehicle occupant. The vehicle occupant restraint system as used herein may include air bag systems, seat belt pretensioners, anti-submarine systems and active knee bolster systems among others. However, in practice, the stature of the vehicle occupant can vary a great deal, and a certain degree of compromise is unavoidable. This problem can be mitigated by detecting the nature of the vehicle occupant by using a suitable senor and controlling the vehicle occupant restraint system according to the detected nature of the vehicle occupant.

For such an approach to be feasible, the sensor must be capable of identifying the vehicle occupant both reliably and accurately. Japanese patent publication 2001-180353 discloses an arrangement for detecting the magnitude of the load of the vehicle occupant. The contents of this Japanese patent application is hereby incorporated in this application by reference. Japanese patent publication 2001-294119 discloses such a sensor using both a load sensor and a proximate sensor to the end of detecting both the weight and size of the vehicle occupant. However, according to such previous proposals, it was difficult to achieve both the reliability and precision that are required for the contemplated purposes. Also, such sensors interfere with the existing seat design, and this undesirably adds to the cost of the seat. In particular, a vehicle seat is sometimes equipped with a seat beater, and it can seriously impair the performance of the sensor if the sensor is incorporated in the seat cushion or the upholstery member.

BRIEF SUMMARY OF THE INVENTION

In view of such problems of the prior art, a primary object of the present invention is to provide a vehicle seat incorporated with a sensor for identifying the vehicle occupant which is both reliable and accurate.

A second object of the present invention is to provide a vehicle seat incorporated with a sensor for identifying the vehicle occupant which requires a minimum modification to the existing seat design.

A third object of the present invention is to provide a vehicle seat incorporated with a sensor for identifying the vehicle occupant which would not interfere with other equipment of the seat such as a seat heater.

According to the present invention, at least some of these problems can be eliminated by providing a vehicle seat, comprising: a seat frame; a spring assembly supported by the seat frame; and an upholstery assembly covering at least part of the seat frame and spring assembly; the spring assembly including a central support member adapted to support at least most of a load of a vehicle occupant seated in the seat, a plurality of spring members supporting the central support member relative to the seat frame, and a plurality of displacement sensors each for detecting a displacement of a selected point of the central support member relative to the seat frame. Preferably, the spring assembly may be incorporated in a sub frame which is separate from the main seat frame and attached to the main seat frame.

The central support member which typically but not exclusively consists of wire mesh or grid and may or may not provide spring characteristics supports most of the load of the vehicle occupant, and undergoes a relatively large displacement when the occupant is seated in the seat. For instance, the central support member may include a grid or mesh formed by a substantially straight wire member and/or a wavy wire member. Therefore, by detecting the displacements of various parts of the central support member, preferably peripheral parts thereof, the magnitude of the total load and distribution of the load can be evaluated both reliably and accurately. Additionally, displacement sensors for measuring such large displacements are relatively inexpensive and easy to handle. Also, such sensors would not interfere with the existing seat designs, and would not be adversely affected by the equipment of the seat such as seat heaters.

For evaluating the nature of the load, the seat may comprise a control unit for producing a control output according to outputs from the sensors, the control unit being incorporated with a CPU programmed so as to identify a load distribution on the central support member, and/or evaluate the sum of the sensors, for instance, by comparing the sum with a threshold value for identifying the identity of a vehicle occupant

BRIEF DESCRIPTION OF THE DRAWINGS

Now the present invention is described in the following with reference to the appended drawings, in which:

FIG. 4 is a schematic front view of the load sensing arrangement of the first embodiment in an unstressed state;

FIG. 5 is a schematic front view of the load sensing arrangement of the first embodiment in a stressed state;

DETAILED DESCRIPTION OF THE PREFERRED EMBODIMENTS

Figure 1:
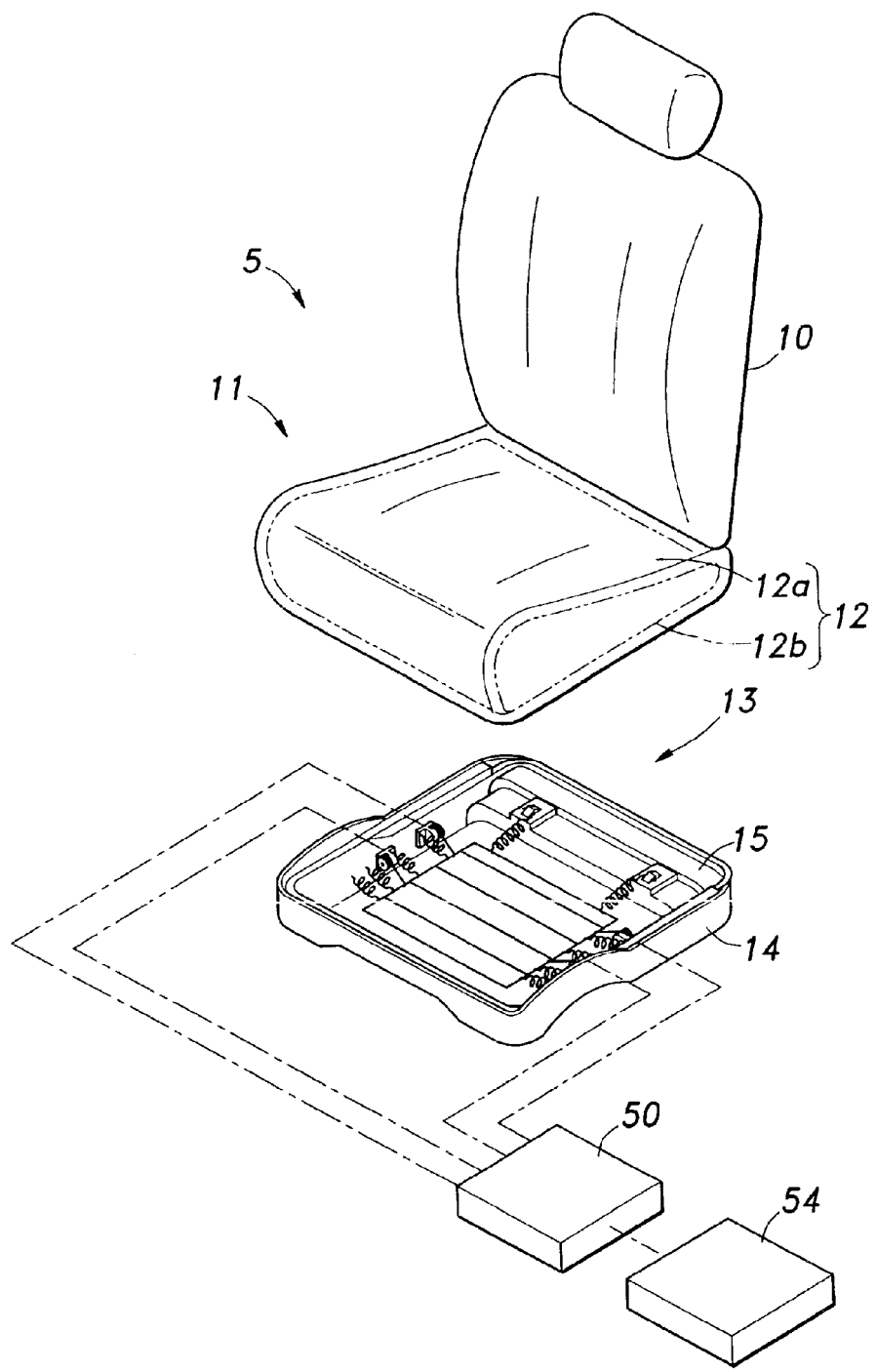
FIG. 1 is an exploded perspective view of a vehicle seat given as a first embodiment of the present invention.

Referring to FIG. 1, the vehicle seat 5 embodying the present invention comprises a seat back 10 and a seat bottom 11. The seat bottom 11 typically comprises a seat frame assembly 13 which is attached to the floor via a slide mechanism or the like not shown in the drawing, and an upholstery assembly 12 placed on the seat frame assembly 13. The upholstery assembly 12 comprises a urethane foam cushion member 12a and a covering member 12b typically made of fabric, leather, vinyl or the like to cover the cushion member 12a and part of the seat frame assembly 13. The seat frame assembly 13 comprises a main seat frame 14 typically consisting of a rectangular pan frame or annular frame a serving as the main structural element for the seat bottom 11 and a sensor/spring assembly 15 fitted in the main seat frame 14 and incorporated with an arrangement for detecting the load of the vehicle occupant as will be described hereinafter. The vehicle occupant as used in this specification may include adults, children, infants, child seats and luggage among other possibilities. The main seat frame 14 may also consist of various other possible structures other than that illustrated in the drawings.

Figure 2:
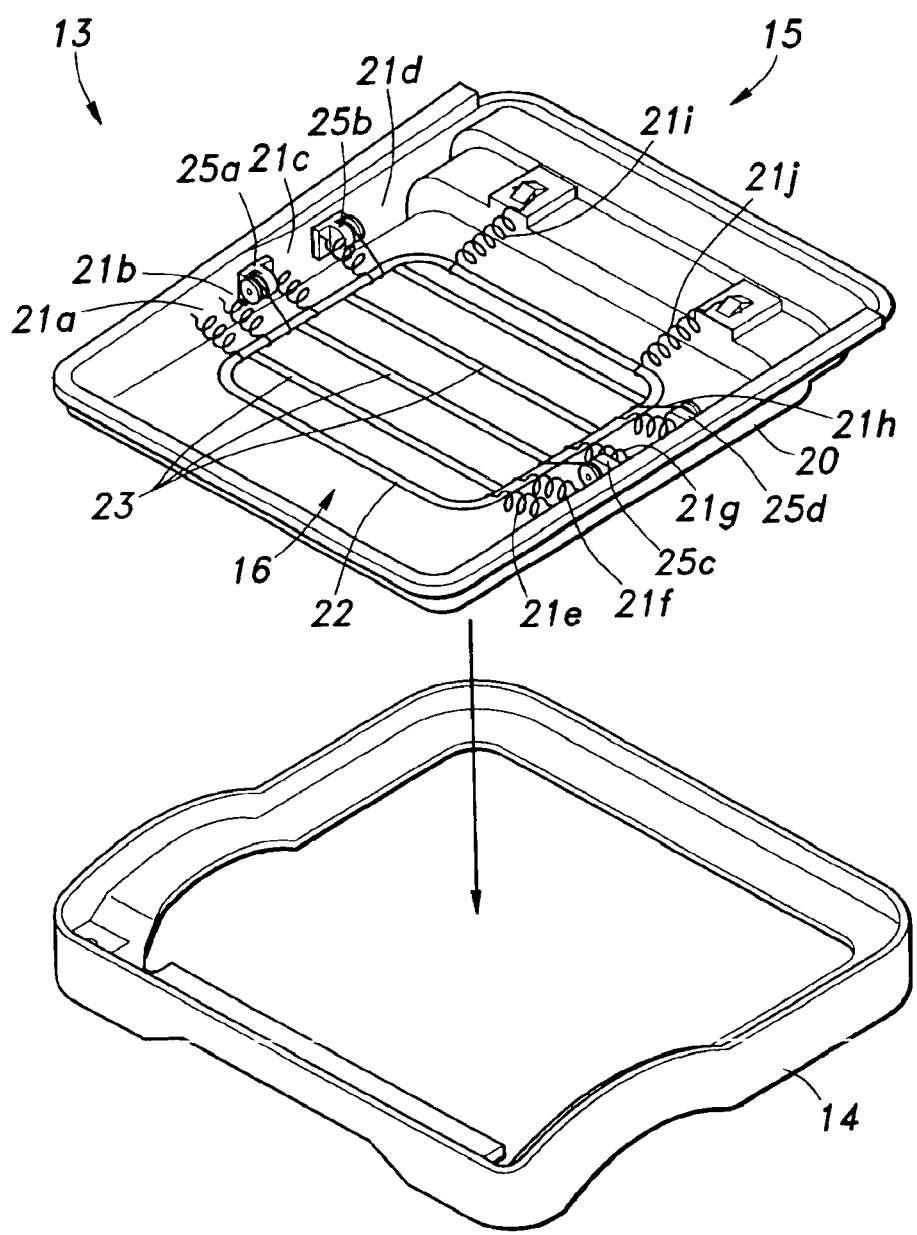
FIG. 2 is an exploded perspective view of the seat frame of the first embodiment.

Referring to FIG. 2, the sensor/spring assembly 15 comprises a sub frame 20 typically consisting of an annular frame received in the main seat frame 14. The sub frame 20 may be fixedly attached to the main seat frame 14 by fasteners such as threaded bolts and rivets or by welding. A planar wire mesh or grid 16 consisting of rectangular wirework formed by spring wire is suspended centrally in the sub frame 20 by eight coil springs 21a to 21i, four on each side and two in the rear. The planar wire mesh 16 includes a rectangular wire frame 22 and a plurality of straight lateral wires 23 extending laterally across the side bars of the wire frame 22. The planar wire mesh 16 may also include wavy lateral wires to provide a resiliency by itself. The cushion member 12a is substantially directly placed on the planar wire mesh 16 while the covering member 12b covers the cushion 12a and part of the main seat frame 14.

Four displacement sensors 25a to 25d are attached to the inner sides of the side members of the sub frame 20 to detect the displacements of the corresponding parts of the planar wire mesh 16. Because these parts are resiliently supported by the coil springs 21a to 21i, the displacements of such parts provide a measure of the load applied to the planar wire mesh 16.

Figure 3:
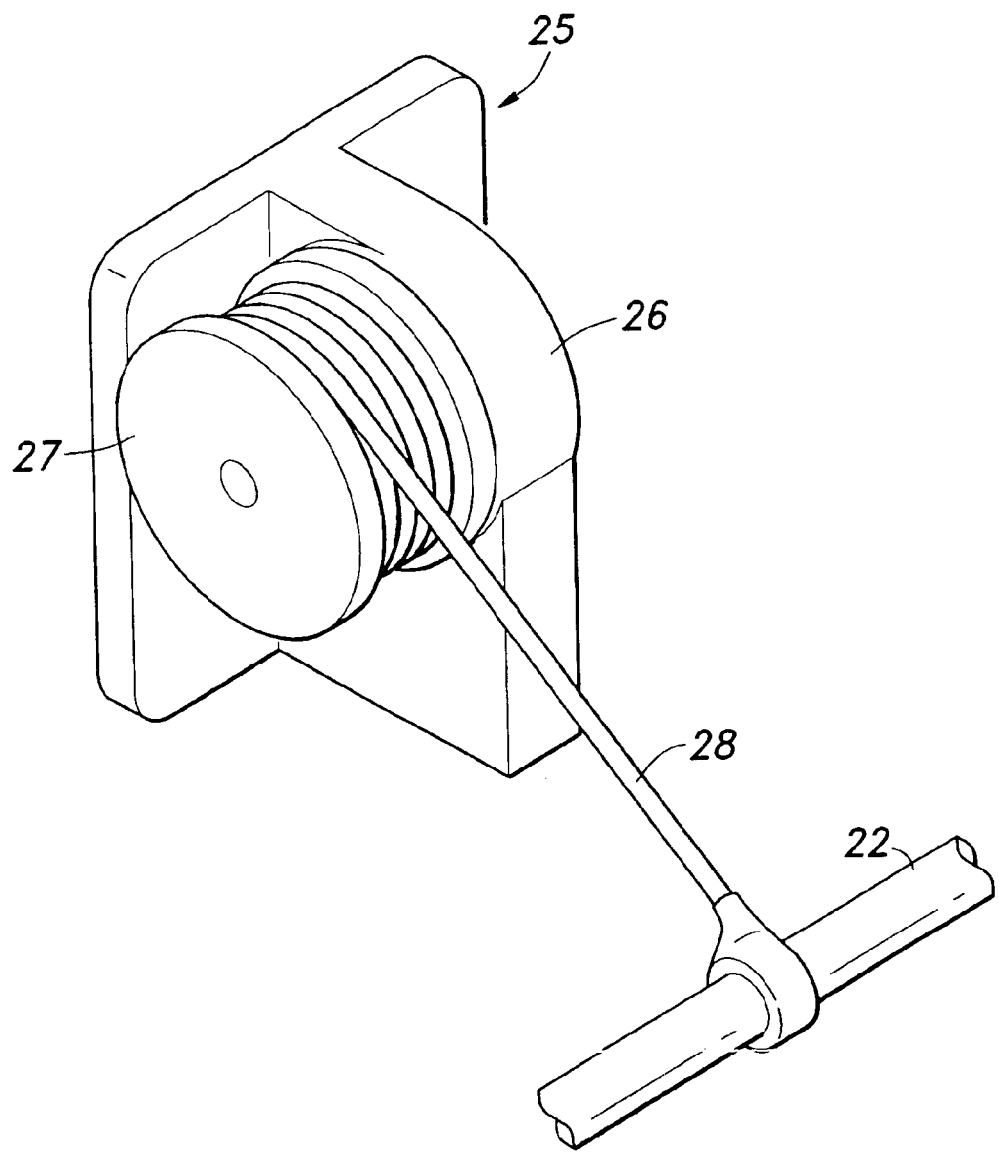
FIG. 3 is an enlarged fragmentary perspective view of the sensor used in the first embodiment.

Referring to FIG. 3, each displacement sensor 25 comprises a pulley 27 supported by a sensor main body 26 so as to be rotatable around an axis extending in the fore-and-aft direction. A length of string 28 is wound around the pulley 27, and the outer end of the string 28 is connected to an adjacent part of the wire frame 2 of the planar wire mesh 16. The pulley 27 is resiliently urged by a torsion spring not shown in the drawing in the direction to wind the string 28 onto the pulley 27. Therefore, as the corresponding point of the planar wire mesh 16 displaces downward typically under the load of the vehicle occupant, the string 28 is paid out from the pulley 27 by a corresponding length against the spring force of the internal torsion spring. The sensor main body 26 is incorporated with a potentiometer or other sensing element for detecting the angular displacement of the pulley 27, and the sensor 25 provides a voltage substantially proportional to the vertical displacement of the corresponding part of the planar wire mesh 16.

Referring to FIG. 4, when no load is applied to the seat bottom 11, suppose that the reference length of the string 28 as measured from a prescribed reference point is $X_0$. When a certain load is applied to the seat bottom 11, suppose that the length of the string increases to $X_1$ as shown in FIG. 5. The payout length of the string 28 can be therefore given as $\Delta X$ ($=X_1-X_0$). This substantially corresponds to the elongation of the adjacent coil spring, and gives a measure of the load acting on the planar wire mesh 16.

The payout length of the string 28 corresponds to the rotational angle $\Delta\theta$ of the pulley by the following relationship.

$$\Delta\theta = \Delta X \times 360/2\pi r$$

where r is the radius at which the string is wound on the pulley 27. The rotational angle of the pulley 27 is transmitted to the potentiometer so that the payout length of the string 28 is converted into the rotational angle of the potentiometer. The remaining sensors are provided with an identical structure.

As shown in FIG. 1, the seat is additionally provided with a control unit 50 for identifying the occupant from a selected list of possible forms of the occupant according to the outputs from these sensors 25. The control unit 50 is connected to an air bag controller 54 for suitably controlling the mode of operation of the air bag system according to the identity of the vehicle occupant. For instance, when the vehicle occupant is identified as a child, the control unit 50 provides a command to the air bag controller so as to deploy the air bag in a relatively mild manner.

Because the sensors 25 are provided adjacent to the coil springs 21 and do not interfere with the planar wire mesh 16, the function of the seat bottom 11 is not affected by the presence of the sensors 25, and the existing design features such as seat heaters can be employed without any added cost or problem. In the illustrated embodiment, four sensors 25a to 25d are provided near the four corners of the seat bottom 11, but a fewer or more sensors may be arranged in various parts of the seat bottom depending on the particular application as long as the load distribution of the vehicle occupant can be identified.

Figure 6:
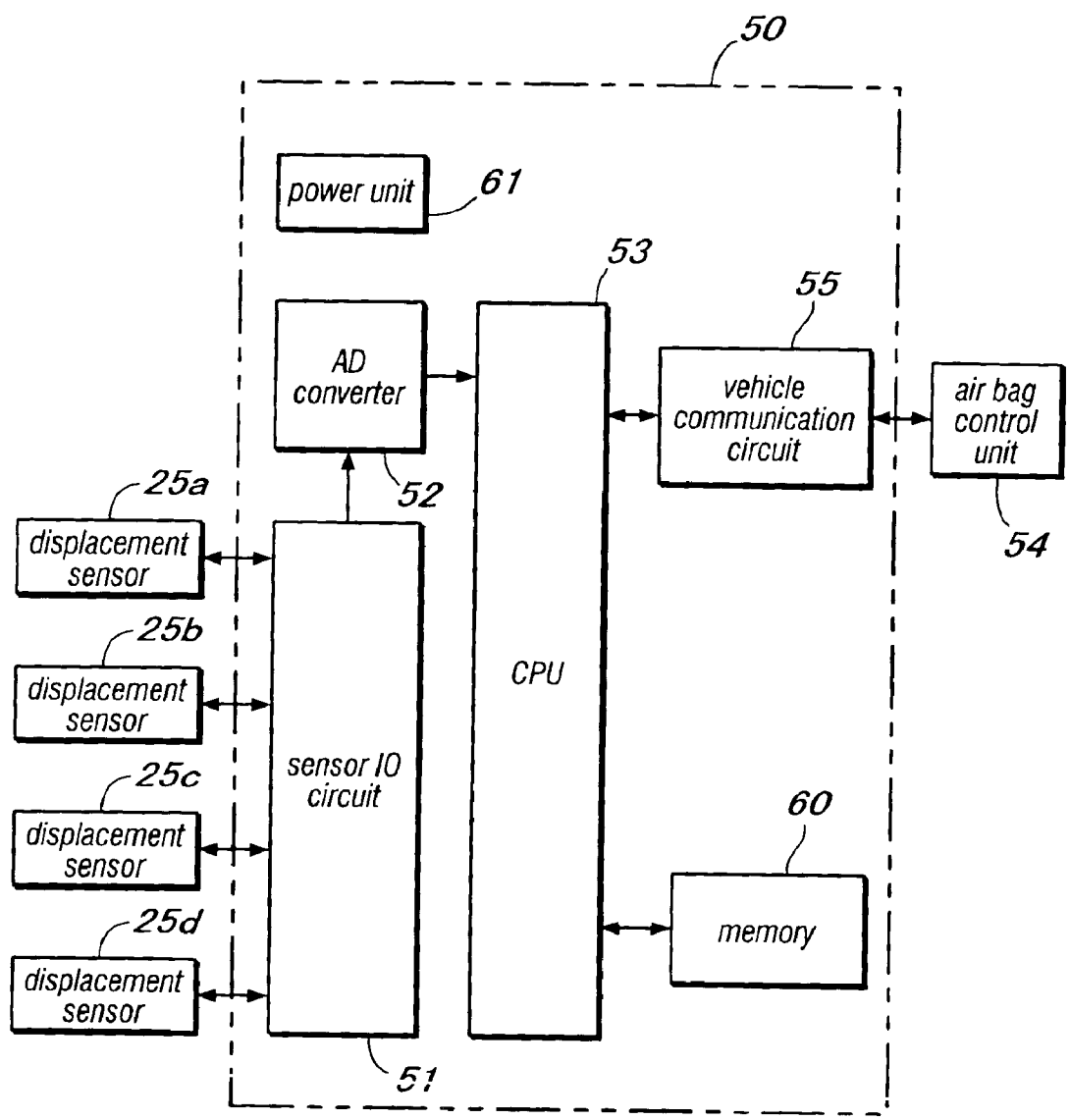
FIG. 6 is a block diagram of the control unit of the first embodiment.

FIG. 6 shows a block diagram of the control unit 50. The control unit 50 comprises a sensor 10 circuit 51 that is connected to the sensors 25, an AD converter 52 for converting the analog output from the sensor 10 circuit 51 into a digital signal, a CPU 53 for controlling various components of the control unit 50 according to a program stored in ROM or the like, a vehicle communication circuit 55 for interfacing the output of the control unit 50 with the air bag controller 54, memory 60 that may consist of EEPROM for storing data required for the operation of the CPU 53, and a power unit 61.

Figure 7:
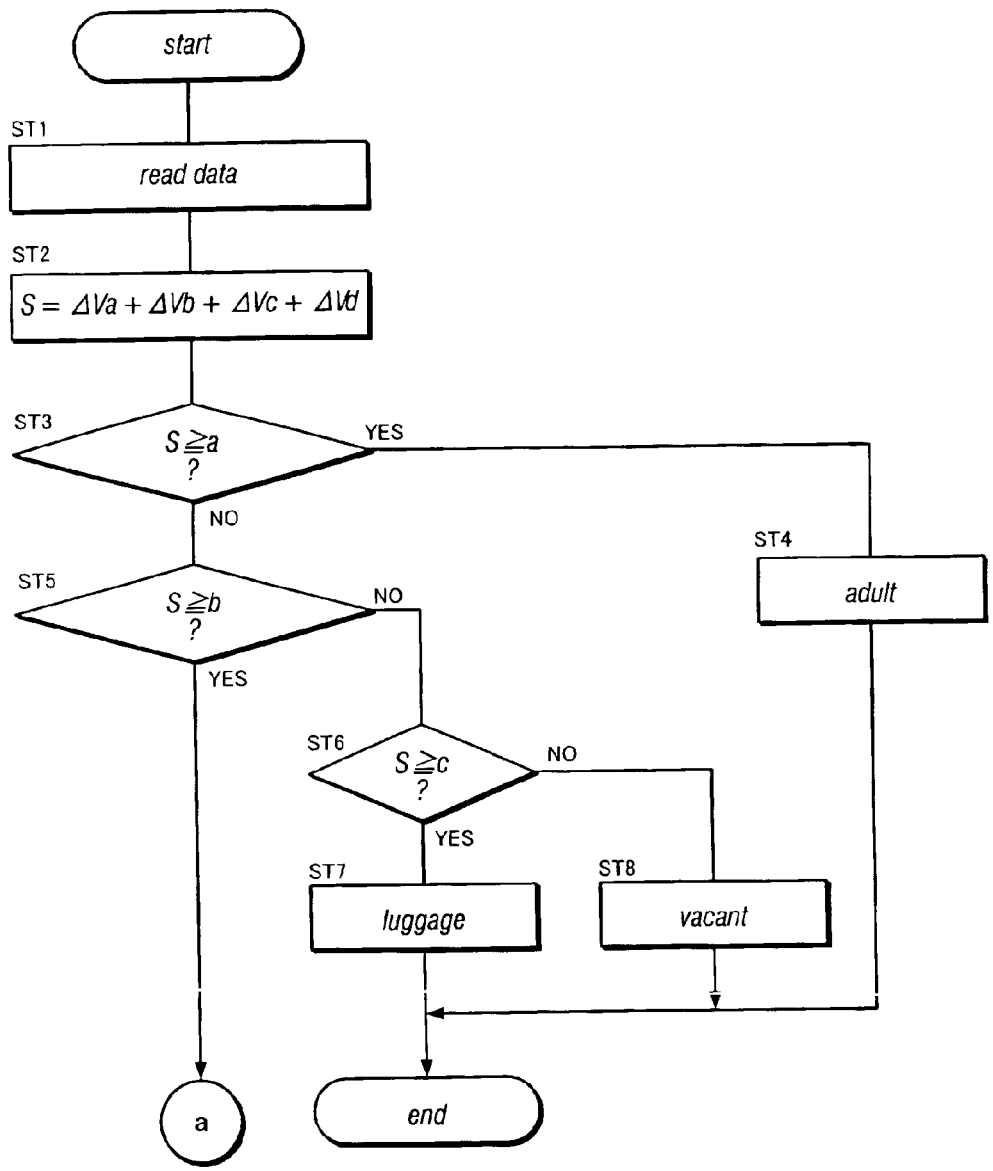
FIGS. 7 and 8 show a flowchart describing the mode of operation of the control unit shown in FIG. 6.
Figure 8:
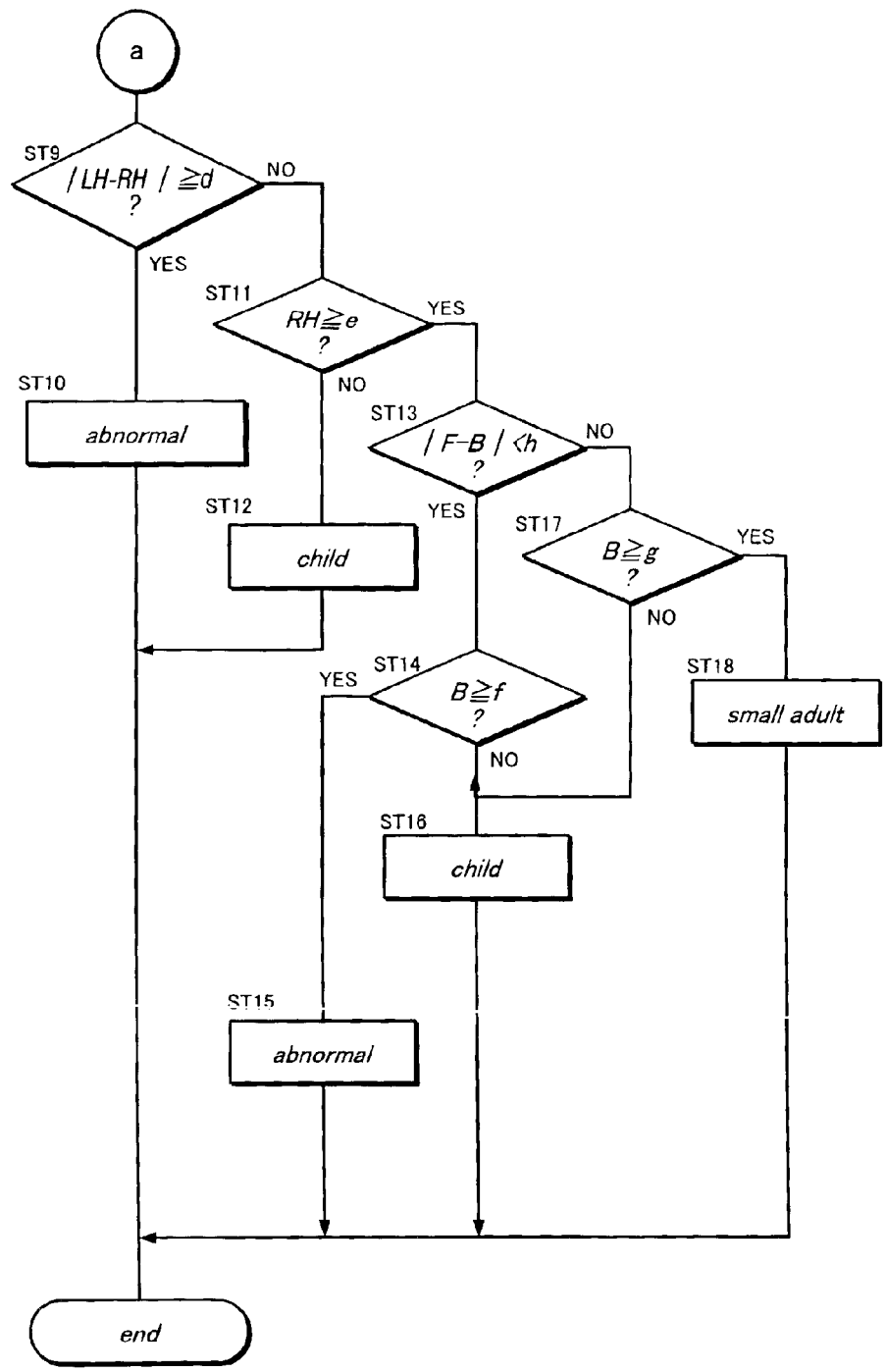
Figure 9:
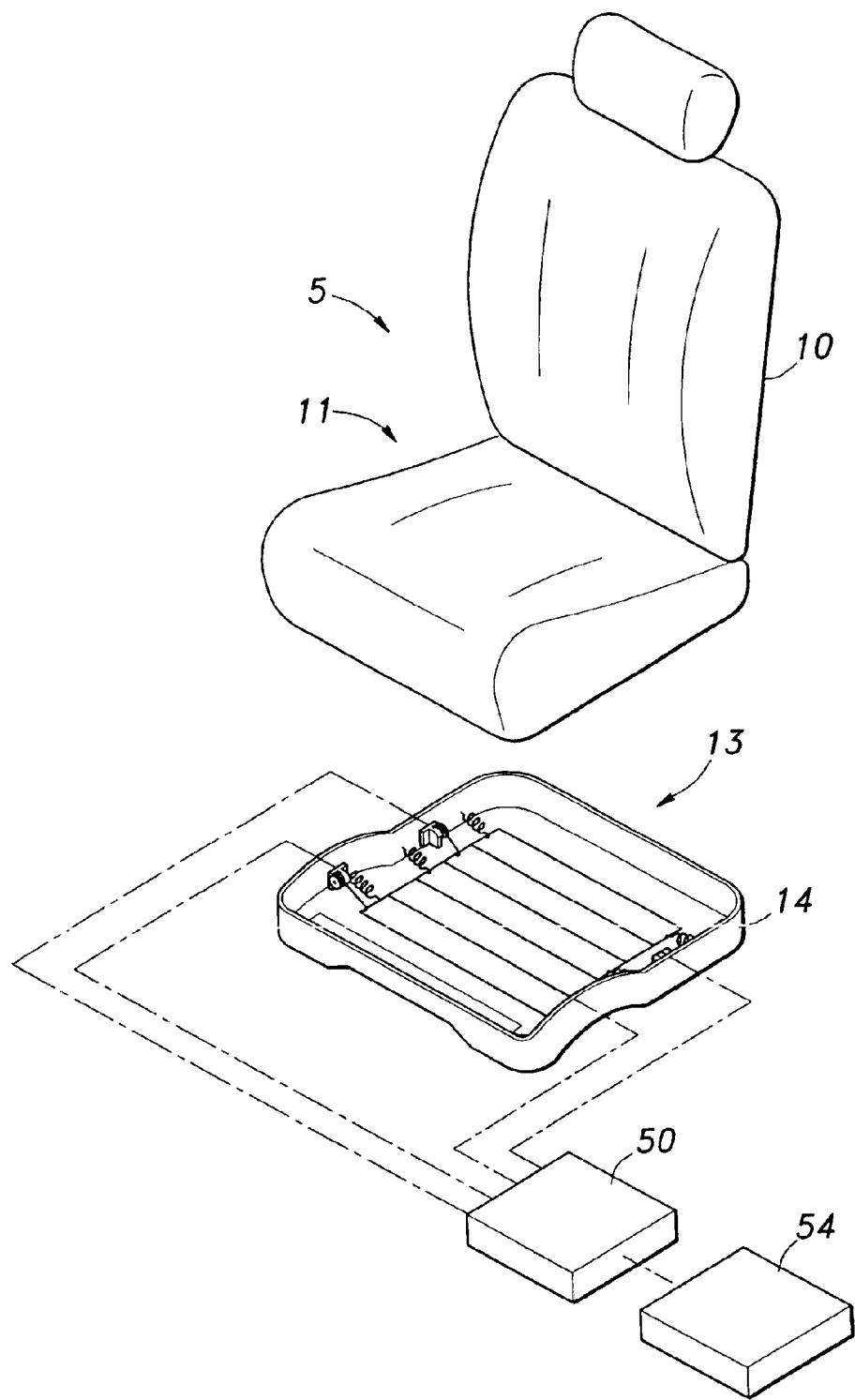
FIG. 9 is an exploded perspective view of a vehicle seat given as a second embodiment of the present invention.
Figure 10:
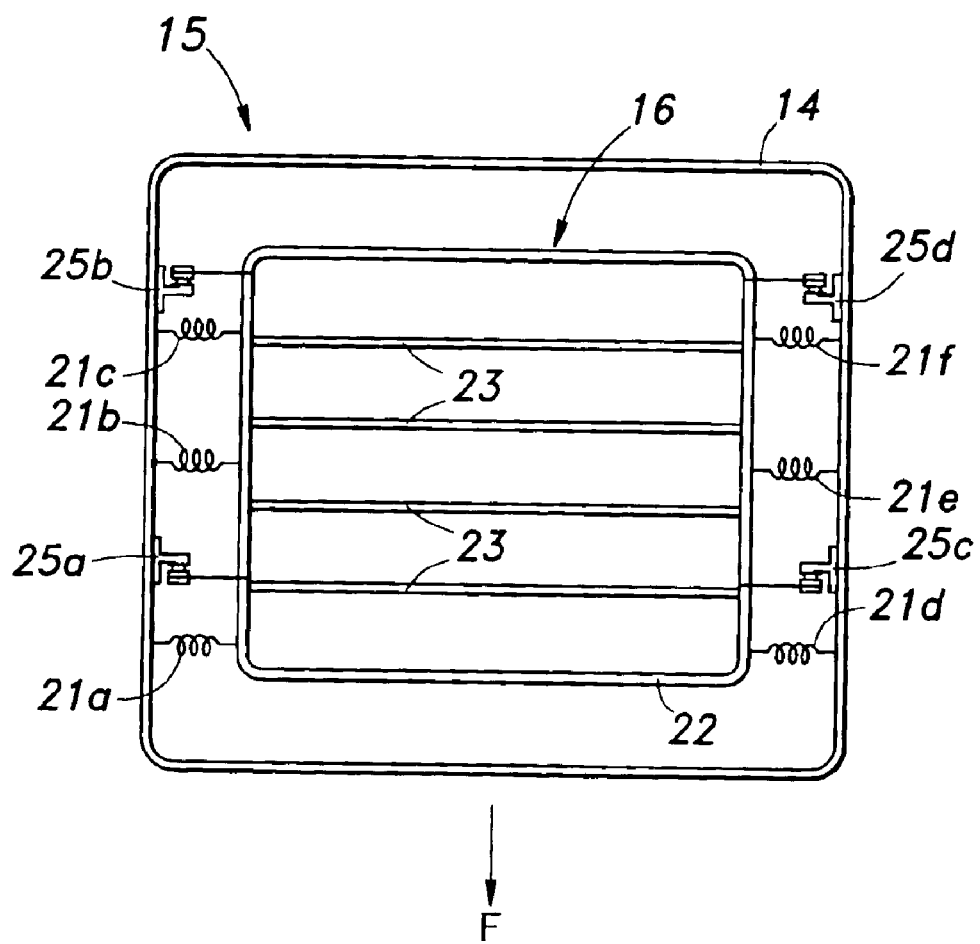
FIG. 10 is a top view of the seat spring arrangement of the second embodiment.

The process of identifying the vehicle occupant is described in the following with reference to the flowchart shown in FIGS. 7 and 8. The initial output values of the sensors 25a to 25d when no occupant is seated on the seat in question ($V_{a0}$, $V_{b0}$, $V_{c0}$ and $V_{d0}$) are stored in the memory 60 when the vehicle is about to leave the factory or at a time point after the door is opened and before the engine is started.

In the illustrated embodiment, the sensors 25a to 25d are arranged adjacent to the four corners of the rectangular planar wire mesh 16 substantially in parallel with the coil springs 21 which support the planar wire mesh 16. When the seat is vacant, the coil springs 21 are relatively unstressed and the strings 28 of the sensors 25 are in a most retracted state as illustrated in FIG. 4. When an occupant is seated in the seat, the weight of the occupant causes the coil springs 21 to elongate and the strings 28 of the sensors 25 to pay out by a corresponding length as shown in FIG. 5. Therefore, the elongation of the string 28 of each sensor 25 gives a measure of the load applied to the corresponding part of the of the seat bottom, and the distribution of the load can be determined by evaluating the outputs of the four sensors 25.

The outputs from these sensors ($V_a$, $V_b$, $V_c$ and $V_d$) are forwarded to the control unit 50 and converted into digital values by the AD converter 52. Based on these digital values, the CPU 53 computes the difference in the output of each sensor before and after the occupant has been seated.

$$\Delta Vn = Vn - Vn0 (n=a, \ldots, d)$$

It is preferable to calibrate the outputs of these sensors 25 because the outputs may vary significantly from one sensor to another depending on the kind of the seat and manufacturing errors. For instance, these sensors may be designed to give the left load (LH), right load (RH) front load (F) and rear load (R) on the seat bottom, but may not provide a uniform sensitivity with respect to these loads detected at the different positions of the seat bottom. It is possible, for instance, that the output of the left sensor is larger in value than that of the others. To avoid the reduction in the dynamic range of measurement due to such variations in the outputs, each of the outputs may be multiplied by a suitable factor or raised in power so that uniform outputs may be obtained from the different sensors.

$$V'_n = A \cdot V_n$$

or $$V'_n = A \cdot V_n^x$$

The factor A and power X can be determined experimentally. By thus compensating for the different configurations of the seat and production errors, the arrangement of the sensors is simplified and the manufacturing cost can be minimized.

By analyzing the outputs from these sensors, it is possible to distinguish five different kinds or states of the vehicle occupant consisting of a regular adult, small adult, child or luggage (including a child seat), absence of an occupant and abnormal occupant. This mode of classification is only an example, and other classifications may also be employed.

The data from the sensors 25a to 25d are read in step ST1, and the outputs of the sensors 25a to 25d are added up ($S = \Delta V_a + \Delta V_b + \Delta V_c + \Delta V_d$) in step ST2. In the illustrated embodiment, there are eight coil springs 21 that support the planar wire mesh 16. Therefore, the sum S does not exactly give the weight of the vehicle occupant, but provides a value substantially proportional to the weight of the vehicle occupant. The outputs of the sensors given by voltage will be used in the control program, but will be treated as load values in the following description.

It is determined in ST3 if the sum S is greater than a threshold value a for a regular adult. If so, as it means that a regular adult has seated in the seat, the program flow advances to step ST4, and this information is transmitted to the airbag control unit 54 before concluding this routine. If the sum S is smaller than the threshold value a, the program flow advances to step ST5.

It is then determined in ST5 if the sum S is greater than a threshold value b for a small adult. If not, the program flow advances to step ST6. It is determined in ST6 if the sum S is greater than a threshold value c for luggage. The threshold values a, b and c are related to each other as given in the following.

$$a > b > c$$

If it is determined in step ST6 that the sum S is greater than the threshold value c, as it means that luggage has been placed on the seat, the program flow advances to step ST7, and this information is transmitted to the airbag control unit 54 before concluding this routine. Otherwise, the program flow advances to step ST8 and the information that the seat is vacant is transmitted to the airbag control unit 54 before concluding this routine.

If it is determined in step ST5 that the sum S is greater than the threshold value b, the program flow advances to step ST9 where the absolute value of the difference between the right and left loads (|LH−RH|) is obtained. It is then determined in step ST9 if this value (|LH−RH|) is greater than a threshold value d. In the illustrated embodiment, the left load LH is given by $\Delta V_c + \Delta V_d$ and the right load RH is given by $\Delta V_a + \Delta V_b$.

If this value (|LH−RH|) is greater than the threshold value d, as it means that the lateral load distribution is uneven, and the vehicle occupant may be seated on one side of the seat bottom. In such a case, the airbag may not be able to produce a desired effect when deployed. The program flow advances to step ST10 and this information is transmitted to the airbag control unit 54 before concluding this routine. In such a case, the airbag controller 54 may issue a visual and/or audible warning to indicate a problem in the way the vehicle occupant is seated in the seat.

If it is determined in step ST9 that the absolute value of the difference between the right and left loads (|LH−RH|) is not greater than the threshold value d, the program flow advances to step ST11. As it means that there is no significant unevenness in the lateral distribution of the load of the vehicle occupant, it is determined in step ST11 if the vehicle occupant is a child by comparing the right load RH with a threshold value e. If it is determined in step ST11 that the right load RH is not greater than the threshold value e, the program flow advances to step ST12 and the information that the vehicle occupant is a child is transmitted to the airbag control unit 54 before concluding this routine. In such case, the air bag control unit 54 may control the way the airbag is deployed, for instance by deploying it in a mild manner or not deploying it at all.

If it is determined in step ST11 that the right load RH is greater than the threshold value e, the program flow advances to step ST13 where the absolute value of the difference between the rear load B (=$\Delta V_b + \Delta V_d$) and the front load F (=$\Delta V_a + \Delta V_c$) or |F−B| is obtained. If this difference is below a threshold value h, the program flow advances to step ST14. It could mean that a person has sit back in the rear part of the seat. To more accurately determine the kind of the occupant in this situation, the rear load B is compared with a threshold value f in step ST14 to determine if the vehicle occupant is a child. If the rear load B is greater than the threshold value f in step ST14, the program flow advances to step ST15. It means an irregular seating condition or an indeterminate case, and this information is transmitted to the air bag controller 54 before concluding this routine. In this case, the air bag control unit 54 may issue a visual and/or audible warning to indicate a problem in the way the vehicle occupant is seated in the seat. Such an irregular seating condition may include a case where the lateral unevenness in the seating load is not significant but the rear load is relatively great. This may occur when a child stands on the seat.

If it is determined in step ST14 that the rear load B is smaller than the threshold value f, the program flow advances to step ST16. In this case, because the sum S is small and the lateral unevenness in the seating load is not significant while the rear load is smaller than the threshold value f for identifying the case where the vehicle occupant is a child, it is possible that a child is sitting on the front edge of the seat. Therefore, it is determined in step ST16 that a child may be sitting on the front edge of the seat, and this information is transmitted to the air bag controller 54 before concluding this routine. In this situation, the air bag controller may deploy the air bag in a mild manner suitable for restraining a child.

If it is determined in step ST13 that the difference |F−B| is greater than the threshold value h, the program flow advances to step ST17. As it may mean that a person may be sitting on the front edge of the seat, the rear load B is compared with a threshold value g to more accurately determine the kind of the vehicle occupant. If it is determined in step ST17 that the rear load B is not greater than the threshold value g for identifying that the vehicle occupant is a small adult, as it may mean that a child is sitting on the front edge of the seat, the program flow advances to step ST16 to execute the process described above.

If it is determined in step ST17 that the rear load B is greater than the threshold value g, the program flow advances to step ST18. In this case, because the sum S is small and the lateral unevenness in the seating load is not significant while the rear load is greater than the threshold value g for identifying the case where the vehicle occupant is a small adult, it is possible that the vehicle occupant is a small adult, and this information is transmitted to the air bag controller 54 before concluding this routine. In this situation, the air bag controller 54 may deploy the air bag in a mild manner suitable for restraining a small adult.

FIGS. 9 to 14 show a second embodiment of the present invention which is similar to the first embodiment. In these drawings, the parts corresponding to those of the previous embodiment are denoted with like numerals without repeating the description of such parts.

Figure 11:
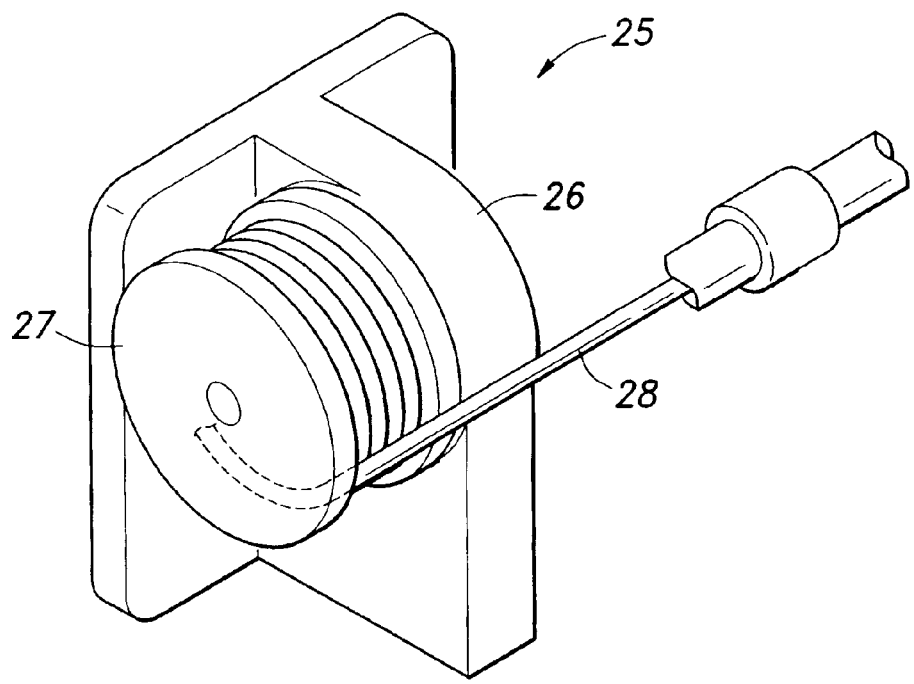
FIG. 11 is an enlarged fragmentary perspective view of the sensor used in the second embodiment.
Figure 15:
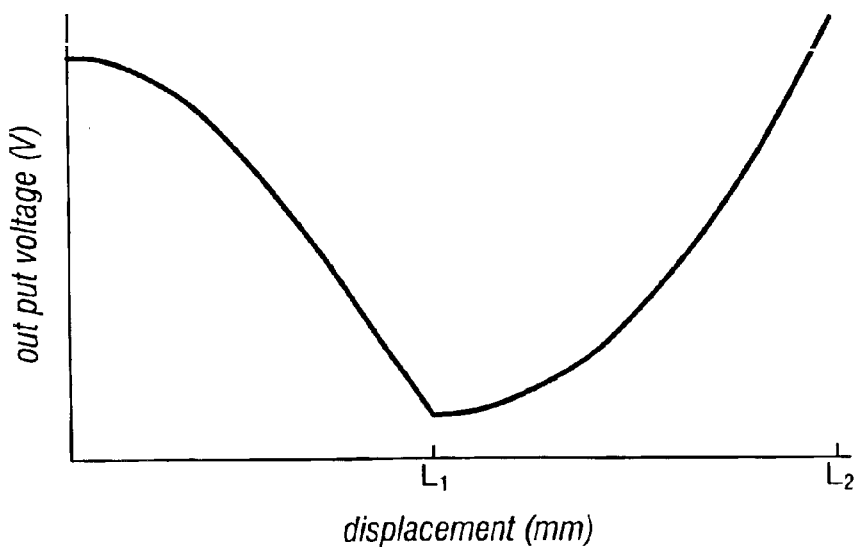
FIG. 15 is a graph showing the relationship between the elongation (payout) of the string and the output voltage of the sensor.
Figure 12:
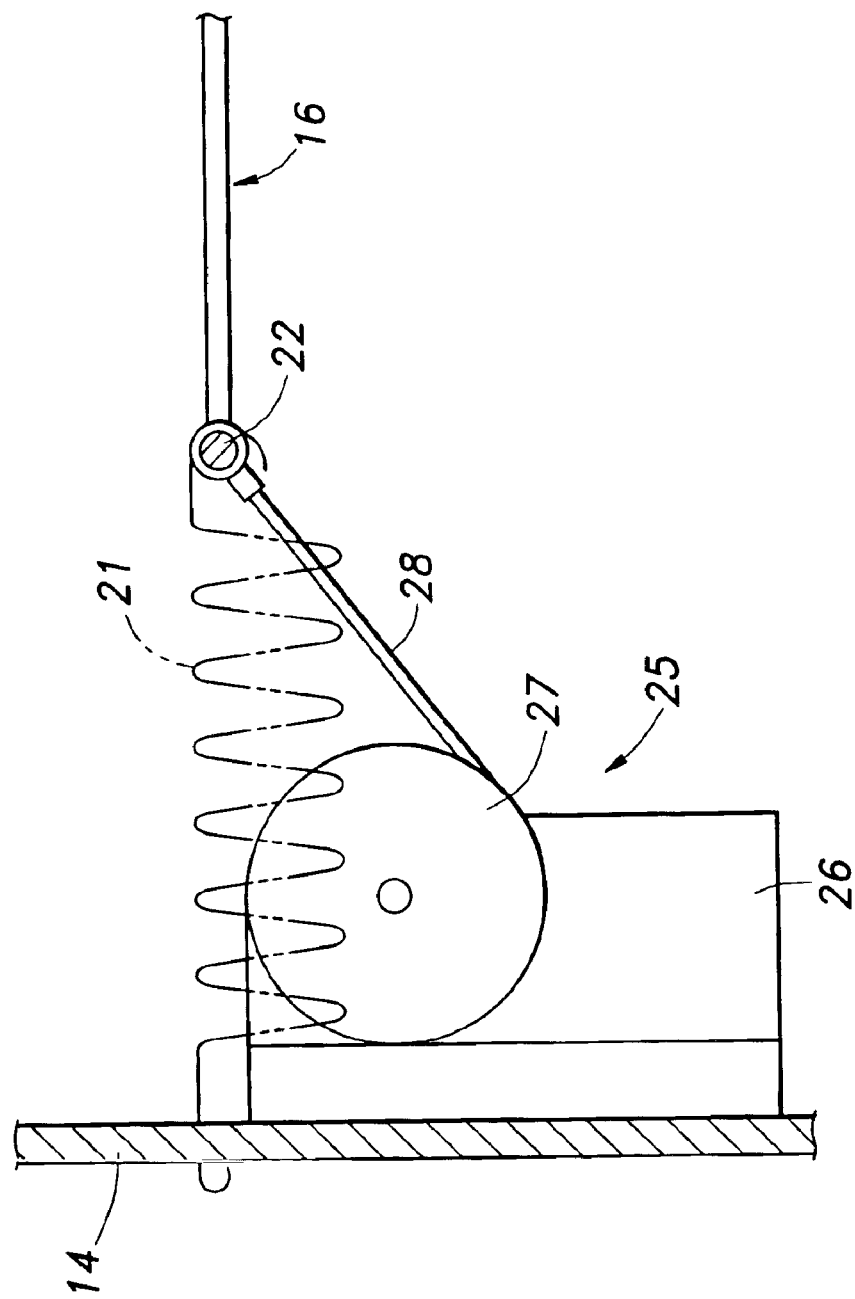
FIG. 12 is a schematic front view of the load sensing arrangement of the second embodiment in an unstressed state.
Figure 13:
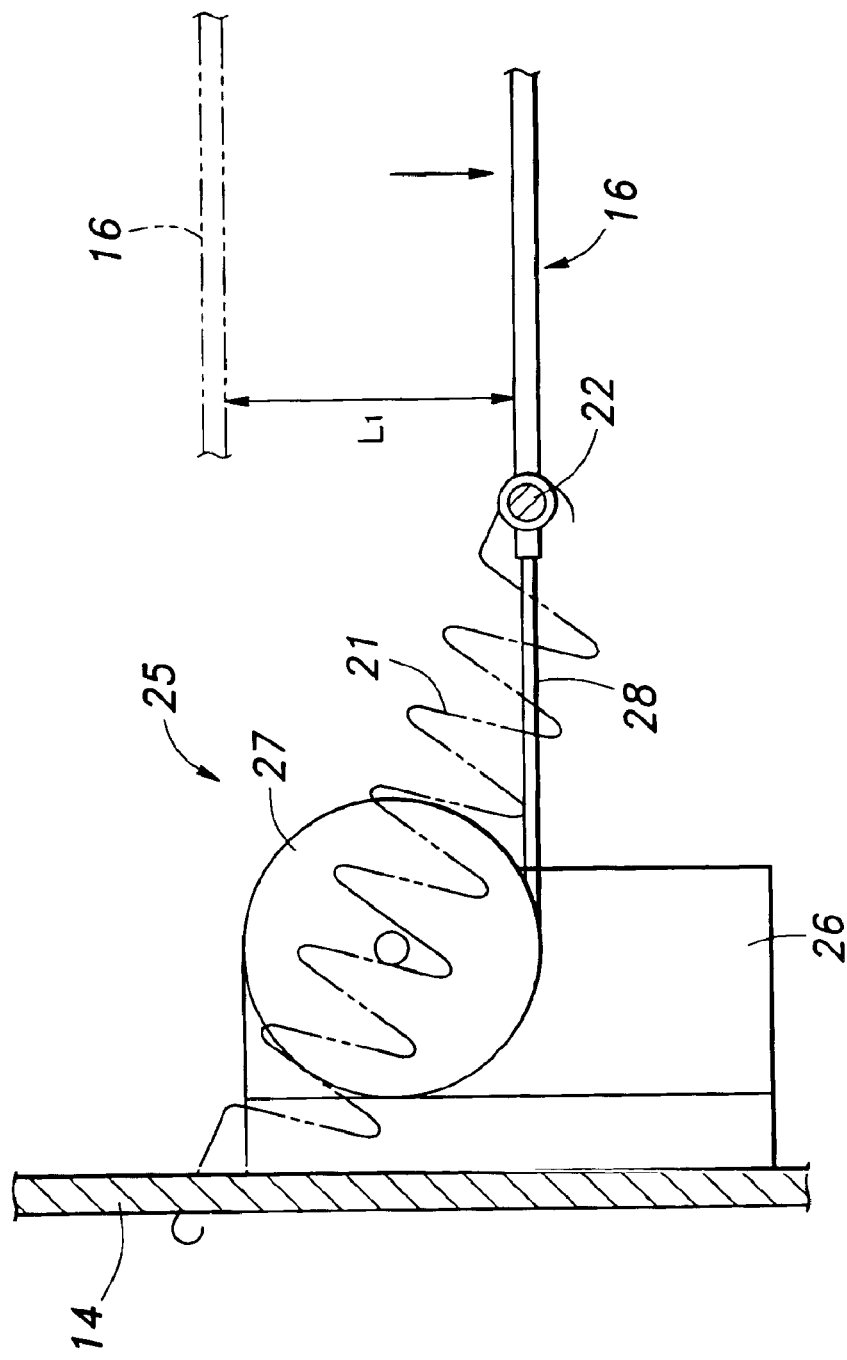
FIG. 13 is a schematic front view of the load sensing arrangement of the second embodiment in a moderately stressed state.
Figure 14:
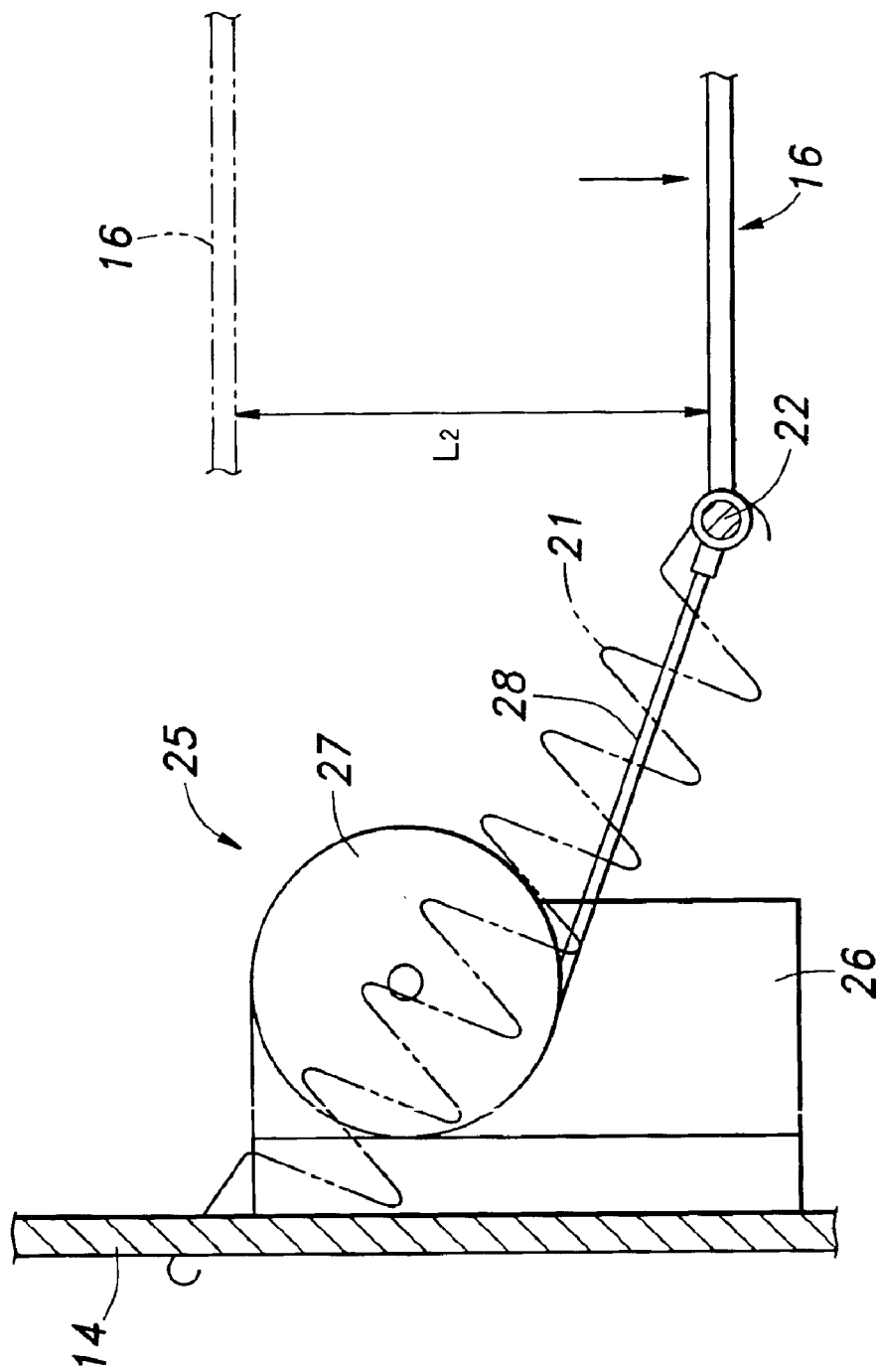
FIG. 14 is a schematic front view of the load sensing arrangement of the second embodiment in a fully stressed state.
Figure 16:
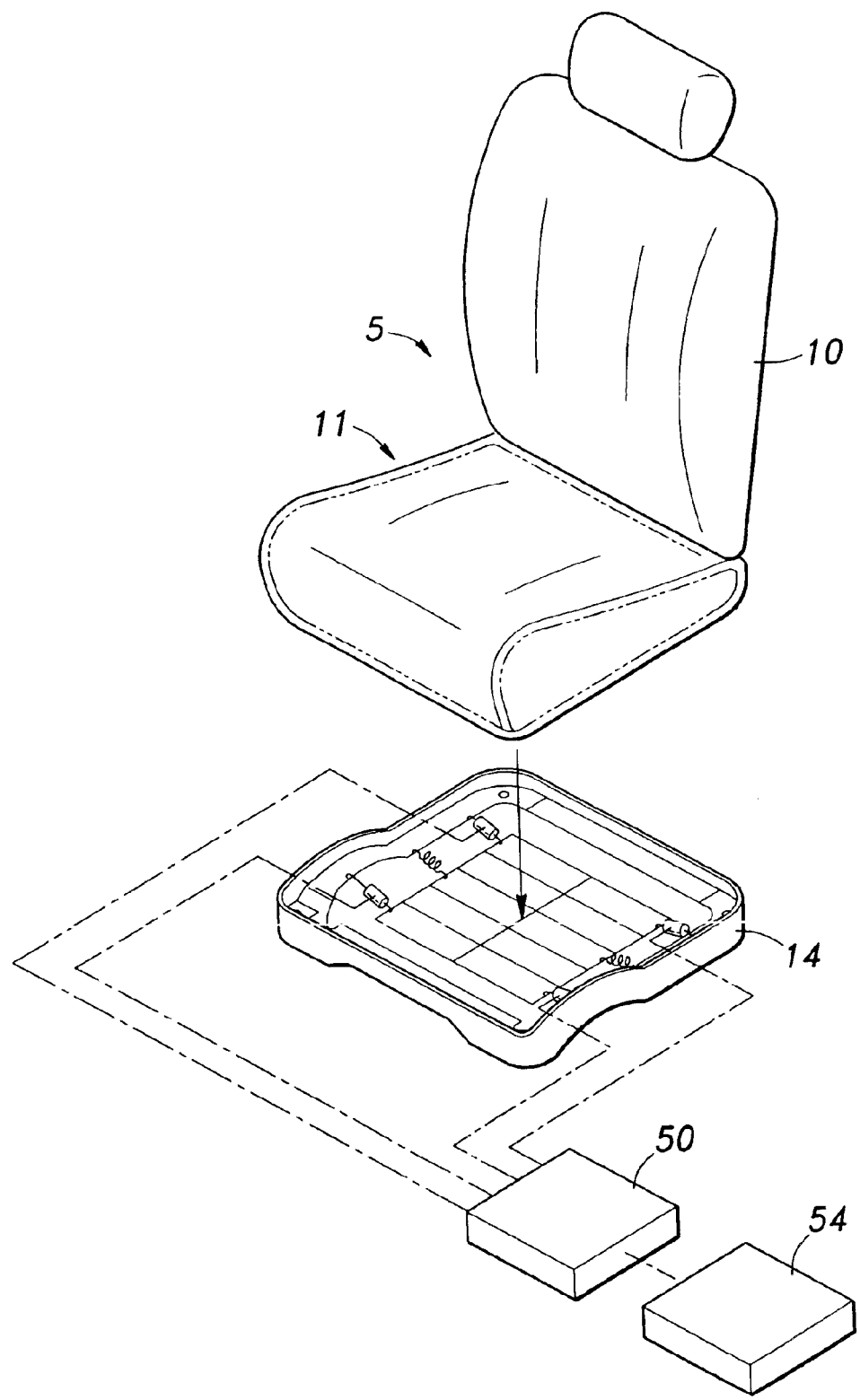
FIG. 16 is an exploded perspective view of a vehicle seat given as a third embodiment of the present invention.
Figure 17:
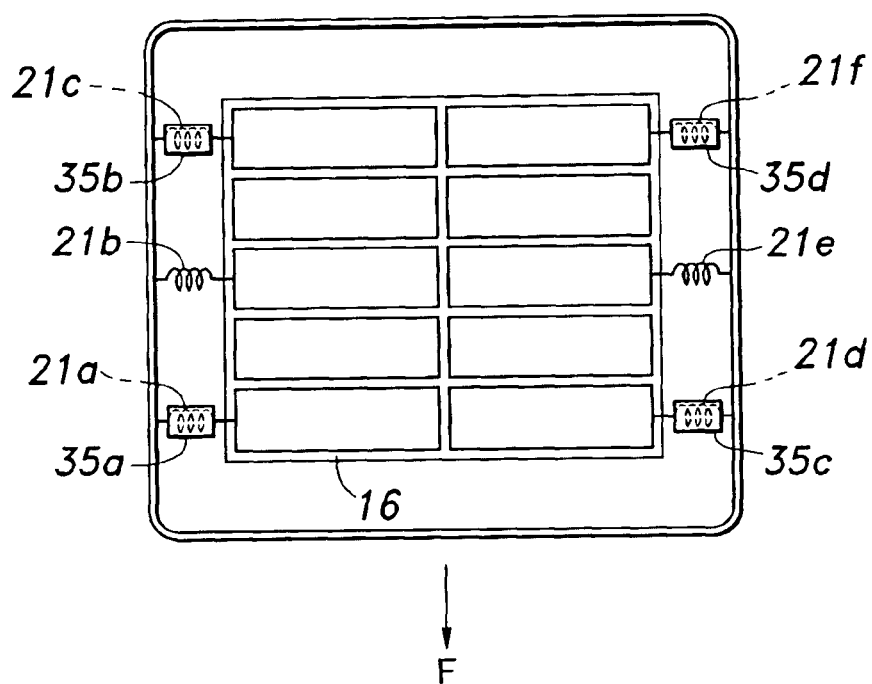
FIG. 17 is a top view of the seat spring arrangement of the third embodiment.

In this embodiment, six coil springs 21a to 21d are used, three on each side. Four displacement sensors 25a to 25d are provided between a part of the planar wire mesh 16 adjacent to each corner and an adjacent part of the lateral bar of the main seat frame 14. In this embodiment, as shown in FIGS. 11 and 12, each sensor 25 which is by itself similar to those of the previous embodiment is placed in such a manner that the axial center of the pulley 27 is located lower than the planar wire mesh 16 in an unstressed state of the coil springs 21. In this embodiment, when the load is applied to the planar wire mesh 16 and the wire mesh 16 moves downward as a resul, the string 28 of each sensor 25 is retracted and wound onto the pulley 27. When the vertical displacement of the wire mesh 16 reaches $L_1$ as shown in FIG. 13, the string 28 reaches a most retracted state. As the wire mesh 16 drops further as indicated by a displacement $L_2$ owing to the increased load on the wire mesh 16, the string 28 is paid out again. Therefore, as shown in FIG. 15, the output voltage of the sensor 25 used in this embodiment initially decreases with the increase in the downward stroke of the wire mesh 16 until the displacement reaches $L_1$, and then increases as the downward stroke of the wire frame increases beyond the value $L_1$.

According to this embodiment, for the given stroke of the string 28 of the sensor 25, it can accommodate a larger displacement of the wire mesh 16. According to this embodiment, because one value of the output voltage corresponds to two possible displacements of the wire mesh 16, a certain measure is required to distinguish which of these two values is valid in each particular case. If the sensor is placed low enough and is provided with an adequate payout length of the string, the output voltage may be allowed to monotonically decrease (or increase) with the increase in the downward stroke of the wire frame 16.

The displacement sensors are not limited to those described above, but may consist of any known sensors including those using Hall devices, differential transformers and electromagnetic induction among other possibilities. In the third embodiment illustrated in FIGS. 16 to 20, each sensor consists of a linear displacement sensor incorporated in a coil spring that extends between the wire mesh and an adjacent part of the main seat frame. In these drawings, the parts corresponding to those of the previous embodiments are denoted with like numerals without repeating the description of such parts.

Figure 18:
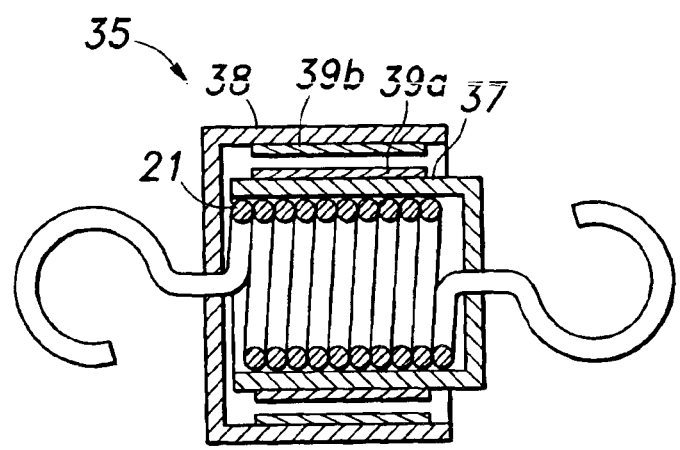
FIG. 18 is an enlarged longitudinal sectional view of the sensor incorporated in a coil spring which is used in the third embodiment.

In this embodiment, six coil springs 21 are used, three on each side, and four of them near the four corners are each incorporated with the linear displacement sensor 35. Referring to FIG. 18, The linear displacement sensor 35 comprises an inner cup-shaped member 37 including a tubular portion receiving a coil spring 21 therein and a bottom portion integrally attached to an end of the coil spring 21, and an outer cup-shaped member 38 including a tubular portion receiving the inner cup-shaped member therein and a bottom portion integrally attached to the other end of the coil spring 21. Therefore, as the two ends of the coil spring 21 move toward and away from each other, the tubular portions of the inner and outer cup-shaped members 37 and 38 move telescopically relative to each other. An inner electrode 39a is attached to the outer surface of the tubular portion of the inner cup-shaped member, and an outer electrode 39b is attached to the inner surface of the tubular portion of the outer cup-shaped member 38.

Figure 19:
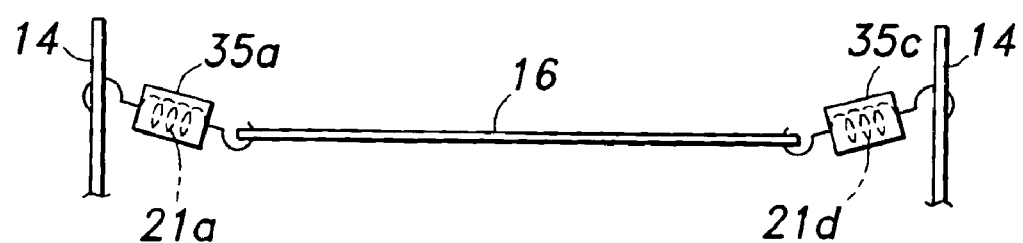
FIG. 19 is a schematic front view of the load sensing arrangement of the third embodiment in an unstressed state.
Figure 20:
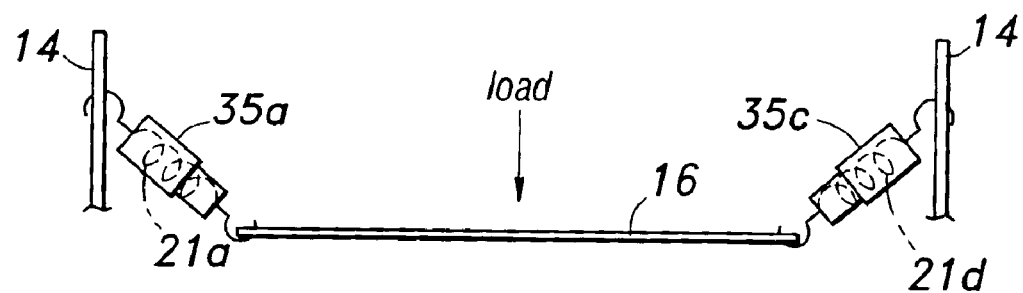
FIG. 20 is a schematic front view of the load sensing arrangement of the third embodiment in a stressed state.

Therefore, the electrostatic capacitance between these two electrodes 39a and 39b changes substantially in proportion to the relative displacement between the two ends of the coil spring 21. FIGS. 19 and 20 show the coil springs 21a and 21d in unstressed and stressed states, respectively. The elongations of these coil springs 21a and 21d produce corresponding displacements of the displacement sensors 35a and 35c. According to this embodiment, because the displacement sensors are incorporated in the coil springs, the addition of the displacement sensors does not substantially affect the existing design of the vehicle seat so that the manufacturing cost can be minimized. Those more commonly referred to as load sensors may also be included as displacement sensors as used herein to the extent such sensors relies on a displacement of an elastic member. For instance, each linear displacement sensor may consist of a load sensor attached to the corresponding coil spring 21.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle seat, comprising:

a seat frame;

a spring assembly supported by said seat frame; and an upholstery assembly covering at least part of said seat frame and spring assembly;

said spring assembly including a central support member adapted to support at least most of a load of a vehicle occupant seated in said seat, a plurality of spring members supporting said central support member relative to said seat frame, and a plurality of displacement sensors each for detecting a displacement of a selected point of said central support member relative to said seat frame;

at least one of said displacement sensors being arranged in parallel with one of the spring members to measure a change in the distance between the corresponding selected point of said central support member relative to a corresponding part of said seat frame.

2. A vehicle seat according to claim 1, wherein said selected points include peripheral points of said central support member.

3. A vehicle seat according to claim 1, further comprising a control unit for producing a control output according to outputs from said sensors, said control unit being incorporated with a CPU programmed so as to identify a load distribution on said central support member.

4. A vehicle seat according to claim 3, wherein said load distribution includes a distribution in a fore-and-aft direction.

5. A vehicle seat according to claim 3, wherein said load distribution includes a distribution in a lateral direction.

6. A vehicle seat according to claim 3, wherein said CPU is programmed so as to evaluate a sum of the outputs of said sensors.

7. A vehicle seat according to claim 6, wherein said CPU is programmed so as to compare the sum of the outputs of said sensors with a threshold value for identifying the identity of a vehicle occupant.

8. A vehicle seat according to claim 1, wherein said central support member includes a grid or mesh formed by a substantially straight wire member.

9. A vehicle seat according to claim 1, wherein said central support member includes a grid or mesh formed by a wavy wire member.

10. A vehicle seat according to claim 1, wherein said central support member includes a grid or mesh formed by a combination of a substantially straight wire member and a wavy wire member.

11. A vehicle seat according to claim 1, wherein said spring members comprise tension coil springs.

12. A vehicle seat according to claim 1, wherein each of said displacement sensors is incorporated in a corresponding one of said spring members.

13. A vehicle seat according to claim 1, wherein each of said displacement sensors comprises a sensor main body attached to said seat frame, a spring loaded pulley rotatably supported by said sensor main body, a string wound around said pulley and having one end attached to said central support member, and an angular sensor incorporated in said sensor main body for detecting a rotational angle of said pulley.

14. A vehicle seat according to claim 13, wherein a pivot center of said pulley is located in such a manner that said pivot center is below a level of said central support member under an unloaded condition of said seat but above a level of said central support member under a fully loaded condition of said seat.

15. A vehicle seat according to claim 1, further comprising a sub frame attached to said seat frame and having said spring assembly incorporated therein.

16. A vehicle seat according to claim 1, wherein at least one of said displacement sensors includes a pair of electrodes that are attached to respective ends of the corresponding spring member to oppose each other so that a relative distance between the two electrodes may be measured as an electrostatic capacitance between the two electrodes.

17. A vehicle seat according to claim 16, wherein said electrodes are disposed coaxially with each other so as to be telescopically moveable relative to each other.

18. A vehicle seat according to claim 11, wherein at least one of said displacement sensors includes a pair of electrodes that are attached to respective ends of the corresponding tension coil spring to oppose each other so that a relative distance between the two electrodes may be measured as an electrostatic capacitance between the two electrodes.

19. A vehicle seat according to claim 18, wherein said electrodes comprise cylindrical members that are disposed coaxially with each other and with respect to the tension coil spring so as to be telescopically moveable relative to each other.

* * * * *